US006371272B1

(12) United States Patent
Walther et al.

(10) Patent No.: US 6,371,272 B1
(45) Date of Patent: Apr. 16, 2002

(54) DEVICE FOR DELIVERING MATERIAL TO WORK STATIONS

(75) Inventors: Joerg Walther, Korntal; Torsten Buenning, Stuttgart; Olaf Klemd, Markgroeningen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,931

(22) PCT Filed: Feb. 22, 2000

(86) PCT No.: PCT/DE00/00486

§ 371 Date: Dec. 6, 2000

§ 102(e) Date: Dec. 6, 2000

(87) PCT Pub. No.: WO00/51917

PCT Pub. Date: Sep. 8, 2000

(30) Foreign Application Priority Data

Feb. 27, 1999 (DE) ........................................ 199 08 600
Jan. 27, 2000 (DE) ........................................ 100 03 438

(51) Int. Cl.[7] ................................................ B65G 11/00
(52) U.S. Cl. ........................................ 193/4; 193/25 A
(58) Field of Search ................................ 193/2 R, 3, 4, 193/5, 6, 25 A, 25 R

(56) References Cited

U.S. PATENT DOCUMENTS 2,582,207 A 1/1952 Shaw
5,056,641 A * 10/1991 Loefke et al. .............. 193/2 R

FOREIGN PATENT DOCUMENTS

| | | |
|---|---|---|
| CH | 398 369 | 3/1966 |
| CH | 635 532 | 4/1983 |
| DE | 73 37 769 U | 4/1975 |
| DE | 77 23 786 | 11/1977 |
| DE | 94 03 146 U | 6/1994 |
| EP | 0 086 854 A | 8/1983 |
| EP | 0 439 891 A | 8/1991 |

* cited by examiner

*Primary Examiner*—Kenneth W. Noland
(74) *Attorney, Agent, or Firm*—Michael J. Striker

(57) ABSTRACT

A device (10, 10', 50) for furnishing material (12) to work stations is proposed. The device (10, 10', 50) has at least one reservoir, embodied as a chute (14, 14', 54), for the material (12). A discharge point (16, 16', 56) having a gripper tongue (18, 18', 58) adjoins the chute (14, 14', 54). The chute (14, 14', 54) and the discharge point (16, 16', 56) are embodied as parts separably connected to one another. The discharge point (16, 16', 56) can be disposed on one of the two face ends (36, 40, 76, 110) of the at least one chute (14, 14', 54). By means of this arrangement, it is possible with only a few different parts to achieve great versatility in terms of the storage volume of the device (10, 10', 50).

19 Claims, 8 Drawing Sheets

DEVICE FOR DELIVERING MATERIAL TO WORK STATIONS

PRIOR ART

The invention is based on a device for furnishing material to work stations, as generically defined by the preamble to the main claim. One such device is already known from German Utility Model DE-GM 73 37 769. This device has a reservoir for the material, which is embodied as a chute that is adjoined by a discharge point with a gripper tongue and a material metering arrangement. The chute and the discharge point are embodied as a single part. With the selection of the device, the available storage volume for material is accordingly also fixed. If adaptation to as many different storage volumes as possible is to be made possible, a very great number of different-sized devices is needed. However, this has the disadvantage of increasing the numbers of parts.

To be able to dispose a plurality of devices one above the other at a work station, the devices have tabs on their undersides and recesses on their tops, into which the tabs can be hooked. As a result, it is possible to dispose a plurality of devices one above the other and offset from one another. Because of the fixed spacings of the tabs and recesses, however, only limited options in terms of the offset of the devices to one another are feasible.

For guiding a material metering arrangement in the form of a pusher, two bent tabs are provided, within which the material metering arrangement has only a relatively short guide path. As a result, the material metering arrangement can easily become canted, making handling more difficult.

ADVANTAGES OF THE INVENTION

The device according to the invention for furnishing material to work stations, as defined by the characteristics of the body of the main claim, has the advantage over the prior art that a very great versatility in terms of variants is possible, yet only a few different parts are needed. This is due to the fact that the at least one chute for the material and the discharge point are embodied as parts separably connected to one another, and that the discharge point can be disposed at an opening of the chute. A further advantage is considered to be that the storage volume can be adapted exactly to a given task. Furthermore, optimal use can also be made of the space around the work station. Since a customized parts inventory is possible, fewer refill operations are necessary, making it possible to reduce down times in production.

Containers can also be prefilled separately and closed without difficulties by pushers and thus transported. Chutes can be disposed both side by side and one above the other. In the vertical disposition, a plurality of containers can be assembled to make a parts silo. The chutes can also be installed without tools. At the same time, pushers can also be used for metering. They also protect the material against contamination.

Since the chute can be made as an extruded profile, its production is quite economical.

If corresponding extensions and undercut grooves are embodied on opposed outer ends of the chute, then a plurality of devices can be disposed one above the other in a simple way, and offset from one another in an infinitely graduated fashion. For fixing the position of devices disposed one above the other, sliding blocks fixed with screws can be disposed in the grooves.

The individual elements can easily be connected if screw channels are provided in corner regions of the chute, and the discharge point and preferably a connection part can be secured to the chute via screws. To that end, the discharge point has a gripper tongue and a portion in the form of a frame, in whose corner regions openings for the screws are provided.

Good guidance of a material metering arrangement is provided by two rails provided at the discharge point, which extend perpendicular to the gripper tongue and in which a flat portion of the material metering arrangement can be guided. It is favorable for the rails to be embodied over the full height of two walls that laterally define the gripper tongue.

For a graduated change in size of the opening of the discharge point, bores are provided at the discharge point, and a bump is provided on the material metering arrangement.

Further advantages and advantageous refinements of the device according to the invention for furnishing material to work stations will become apparent from the dependent claims and the description.

DRAWING

Two exemplary embodiments of the invention are shown in the drawing and described in further detail in the ensuing description.

DESCRIPTION OF THE EXEMPLARY EMBODIMENTS

Figure 1:
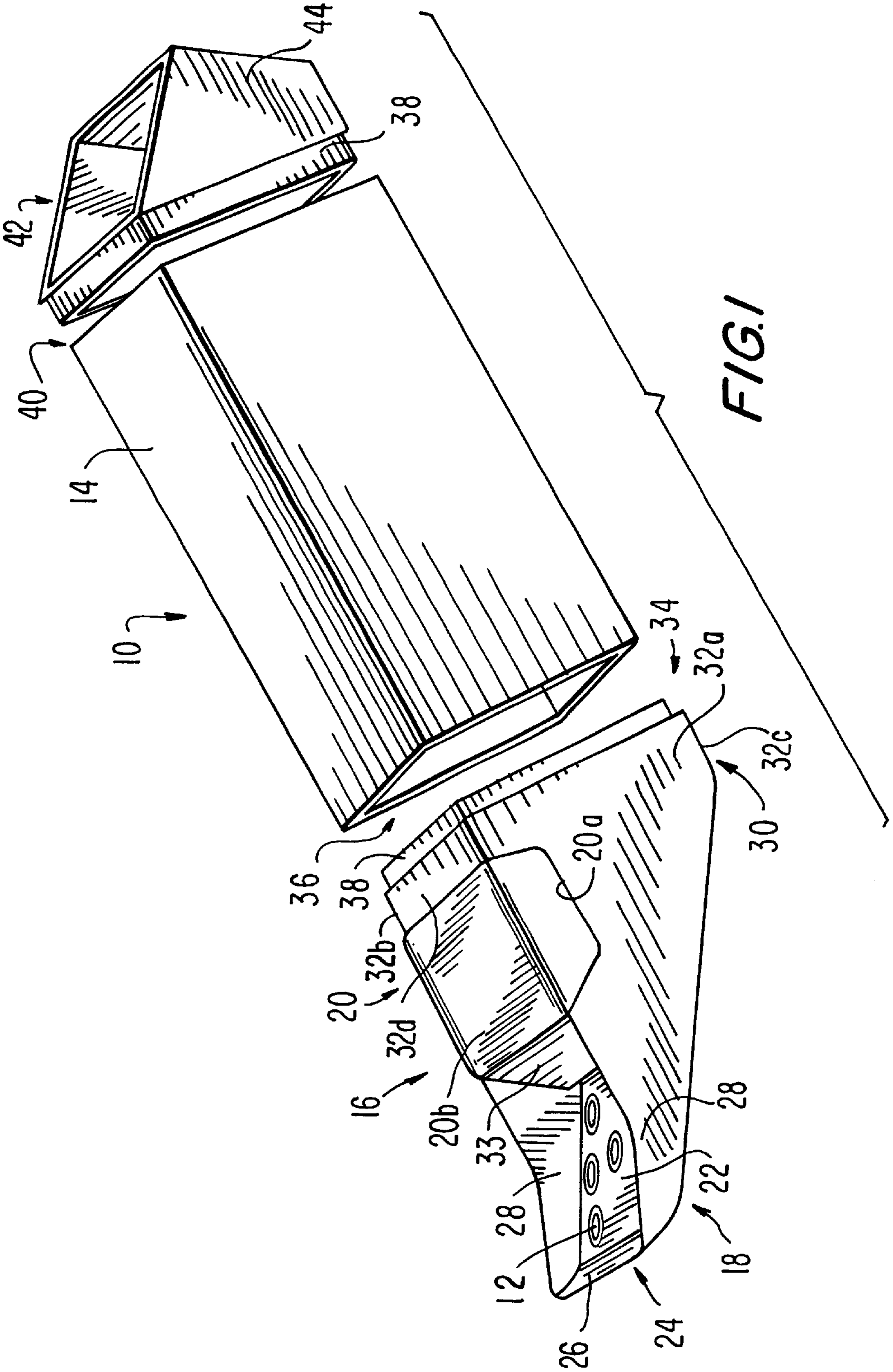
FIG. 1 shows a first exemplary embodiment of a device for furnishing material to work stations, in a perspective exploded view.

In FIG. 1, a device 10 for furnishing material 12 to work stations is shown in the form of a first exemplary embodiment. The material 12 can involve the most various kinds of components, such as the disks shown, or screws, nuts, electronic components, and so forth, that are installed at work stations. The device 10 has at least one reservoir, embodied as a chute 14, for the material 12. The chute 14 for the material can have a substantially polygonal, preferably rectangular cross-sectional area. However, other cross-sectional areas are also possible. The chute 14 is a semifinished product, manufactured for instance as a sheet-metal part or an extruded aluminum profile or an extruded plastic profile. This makes very economical production possible. Furthermore, the chute 14 can be cut to the required length, and thus the requisite volume can also be achieved in a simple way. The wall thickness of the chute 14 is selected as a function of the material comprising the chute 14, the possible maximum length of the chute, and the material 12 that is to be stored in it.

Adjoining the chute 14 as a further component of the device 10 is a discharge point 16, which comprises a gripper tongue 18, a framelike or chutelike portion 30, and preferably a material metering arrangement 20. The gripper tongue 18 and the material metering arrangement 20 are manufactured for example as diecast metal parts and/or as plastic injection molded parts. The gripper tongue 18 has a base plate 22, on which the material 12 comes to a standstill. On the access side 24, that is, the end where the material 12 is discharged for assembly purposes, an obliquely upward-protruding wall 26 is provided. The gripper tongue 18 also has two side walls 28.

The framelike or chutelike portion 30 of the discharge point 16 has a substantially polygonal, preferably rectangular cross-sectional area. Two opposed walls 32*a*, 32*b* merge with the side walls 28 of the base plate 22. A further wall 32*c* of the portion 30, remote from the access side 24, merges via a rounded corner with the base plate 22. A fourth wall 32*d*, opposite this wall 32*c*, does not extend downward as far as the base plate 22. As a result, an opening 33 is created, through which material 12 can slide from the portion 30 onto the base plate 22 of the gripper tongue 18. Because of the oblique position of the device 10 relative to the vertical, the material 12 slides by gravity through the chute 14 onto the gripper tongue 18 and is possibly stopped by the obliquely upward-protruding wall 26.

The material metering arrangement 20 is provided on the wall 32*d*. To that end, a recess 20*a* is made in the wall 32*d*, and a pusher 20*b* is disposed in the recess; by way of the pusher, the size of the opening 33 can be varied. If the pusher 20*b* is pulled out of the recess 20*a*, more material 12 can pass through the opening 33; if the pusher 20*b* is retracted, correspondingly less material can pass through.

The portion 30 is preferably disposed at a certain angle to the base plate 22 of the gripper tongue 18. The portion 30 ends in an opening or face end 34, which can be disposed at an opening or face end 36 of the chute 14. The chute 14 and the discharge point 16 can preferably be put together in plug-type fashion. To that end, the portion 30 is adjoined by an extension 38 extending all the way around its face end 34, that can be inserted into the chute 14. It is advantageous if the encompassing extension 38 and the chute 14 have a press fit. However, still other connection options between the chute 14 and the discharge point 16 are possible. For instance, the connection can be an adhesive, welded, screw, rivet, or other type of connection.

It should also be noted that walls of the chute 14 can be embodied as described in German Utility Model DE-GM 73 37 769, so that in an advantageous way, a plurality of devices 10 can be disposed one above the other.

A connection part 42 can be disposed at the second opening or face end 40 of the chute 14. Like the discharge point 16, the connection part 42 in the exemplary embodiment of FIG. 1 has an encompassing extension 38. Thus the encompassing extension 38 of the connection part 42 can be inserted into the chute 14. This encompassing extension 38 is preferably adjoined by a fill hopper 44 and/or a cover, not shown. The fill hopper 44 is designed such that material 12 can be introduced into it and can reach the chute 14.

An essential feature of this exemplary embodiment is that the at least one chute 14 and the discharge point 16 are embodied as separate parts, or parts separably connectable to one another, and that the discharge point 16 can be disposed on one of the face ends 36, 40 of the at least one chute 14. It is thus possible for the chute 14 to be manufactured as a semifinished product of variable length. If the chute 14 and the discharge point 16 were embodied as a single part, that would not be possible.

Figure 2:
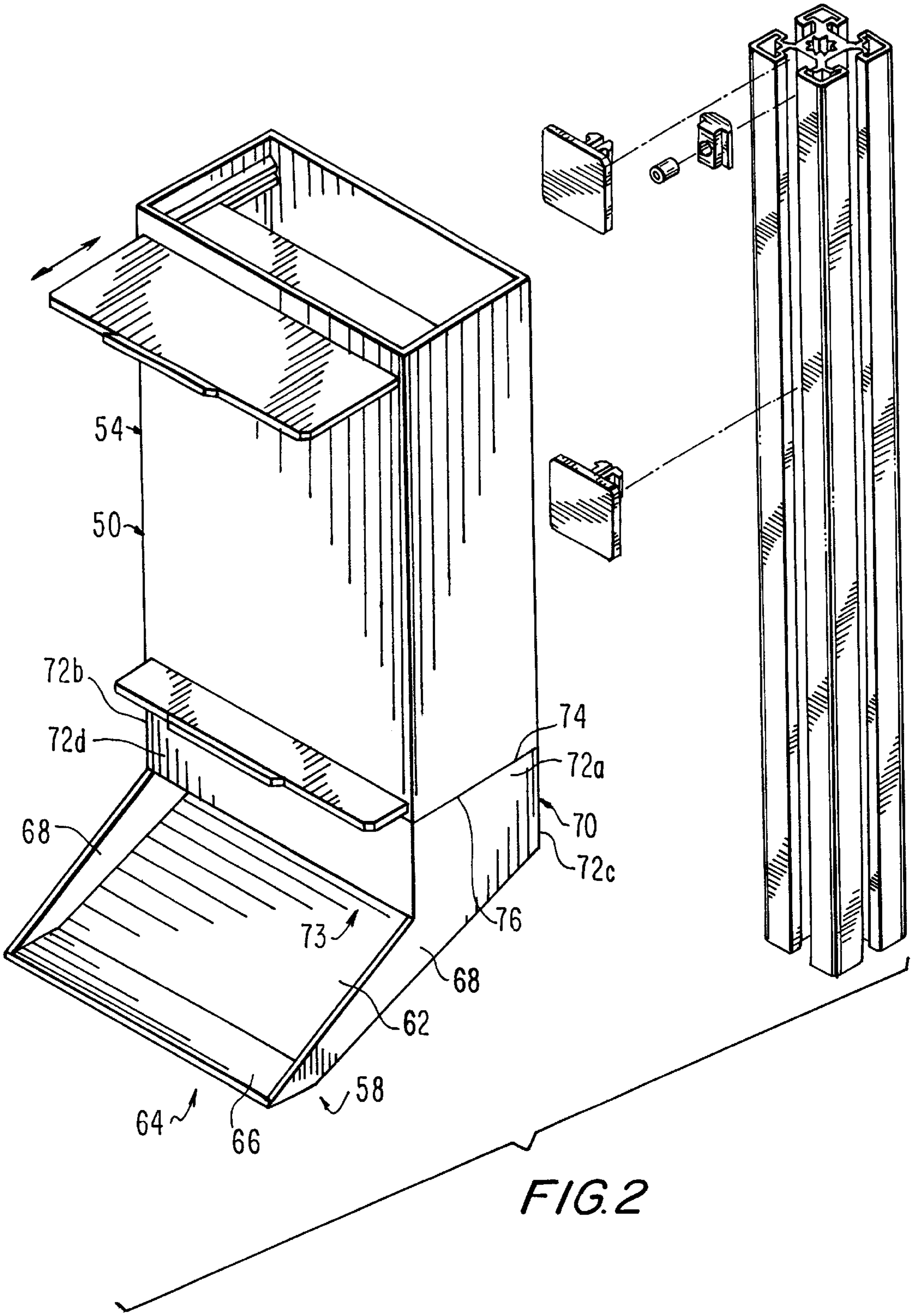
FIG. 2 shows a second exemplary embodiment of a device in a perspective exploded view.

In FIG. 2, a device 50 for furnishing material 12 to work stations is shown in the form of a second exemplary embodiment. The material 12 can involve the most various kinds of components, such as the disks shown, or screws, nuts, electronic components, and so forth, that are installed at work stations. The device 50 has at least one reservoir, embodied as a chute 54, for the material 12. The chute 54 for the material can have a substantially polygonal, preferably rectangular cross-sectional area. However, other cross-sectional areas are also possible. The chute 54 is for instance a sheet-metal part or a plastic part. This makes very economical production possible. The wall thickness of the chute 54 is selected as a function of the material comprising the chute 54, the possible maximum length of the chute, and the material that is to be stored in it.

Adjoining the chute 54 as a further component of the device 10 is a discharge point 16, which comprises a gripper tongue 58 and a chute 70 for material. The gripper tongue 58 has a base plate 62. On the access side 64, that is, the end where the material is discharged for assembly purposes, an obliquely upward-protruding wall 66 is provided. The gripper tongue 18 also has two side walls 68.

The chutelike portion 70 of the discharge point 56 has a substantially polygonal, preferably rectangular cross-sectional area. Two opposed walls 72*a*, 72*b* merge with the side walls 68 of the base plate 62. A further wall 72*c* of the chutelike portion 70, remote from the access side 64, merges with the base plate 62. A fourth wall 72*d*, opposite this wall 32*c*, does not extend downward as far as the base plate 62. This creates an opening 73, through which material can fall from the chutelike portion 70 onto the base plate 62 of the gripper tongue 68. The opening 73 and the obliquely upward-protruding wall 66 are embodied such that material sliding downward on the base plate 62 comes to a stop on the wall 66.

The chutelike portion 70 is preferably disposed at a certain angle to the base plate 62 of the gripper tongue 58. The chutelike portion 70 ends in an opening 74, which can be disposed at a face end or opening 76 of the chute 54. The chute 54 and the discharge point 66 can preferably be put together in plug-type fashion.

Figure 3:
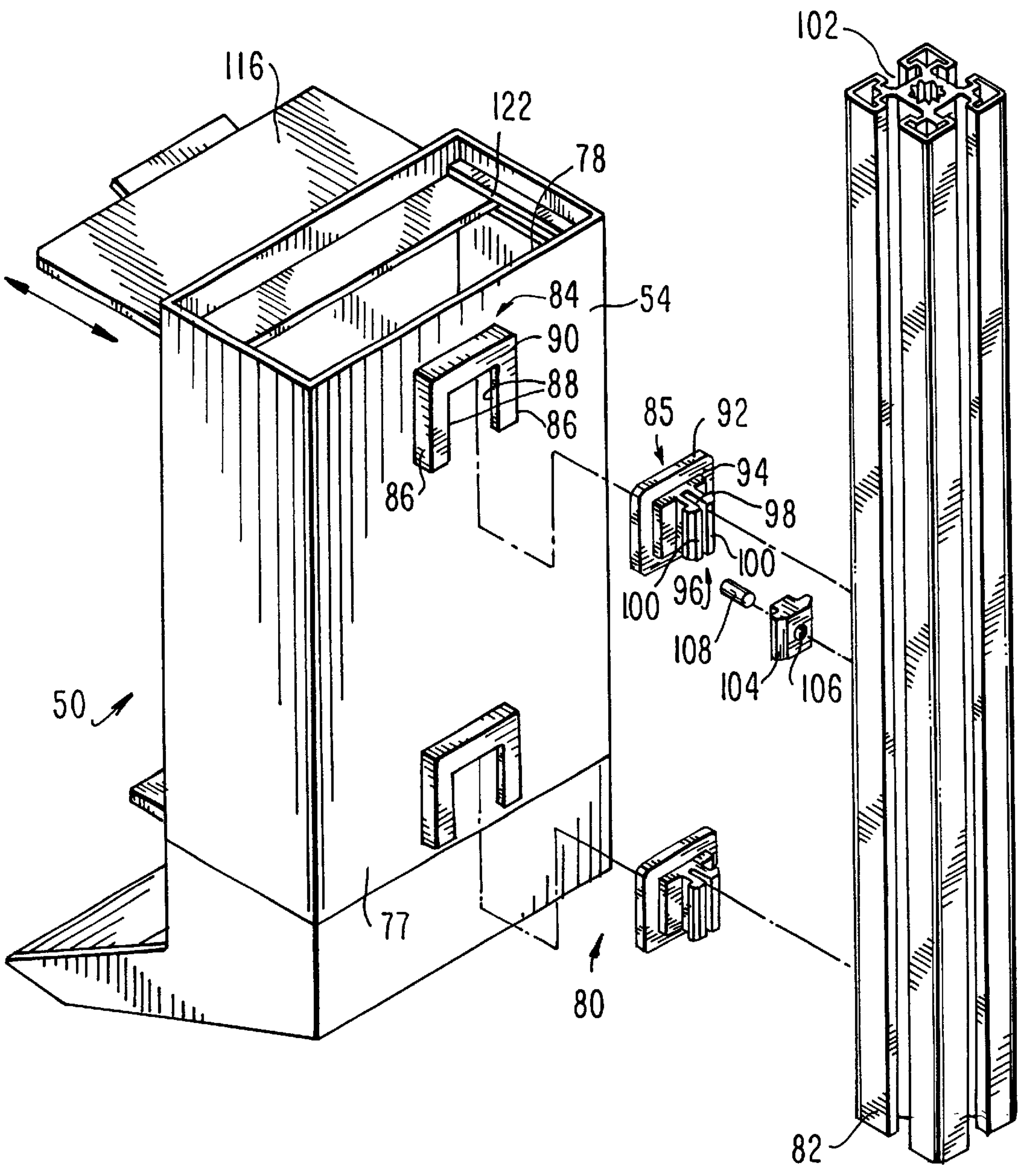
FIG. 3 is a further view of the second exemplary embodiment from a different perspective.

As seen in FIG. 3, means 80 for securing the device 50 to another part, in this exemplary embodiment embodied as a profile bar 82, are provided on an outer side 77 of a wall 78 of the chute 54 that is remote from the access side 64. The means 80 have two U-shaped recesses 84, open at the bottom, disposed one above the other, which are embodied on the outer side 77 of the chute 54, and they also have two connecting elements 85.

A U-shaped recess 84 has two parallel-extending legs 86 of the U, in which undercuts 88 are formed. The base 90 of the U extends between the upper ends of the legs 86 of the U. Each connecting element 85 has a disk 92, with which it can be disposed by insertion in a recess 84, and also has a T-shaped extension 96 embodied on one face 94 of the disk 92. A slot 98 extends through the T-shaped extension 96 in such a way that two hooklike extensions 100 are created, which can be pressed together elastically. The two hooklike extensions 100 of the T-shaped extension 96 are adapted in their cross-sectional shape to an undercut groove 102 of the profile bar 82 and can be disposed in this groove. The hooklike extensions 100 of the T-shaped extension 96 can be introduced into an undercut groove 102 from one face end or from a long side of the profile bar 82. At least one sliding block 104, with a transverse bore 106 for a threaded pin 108, is also provided, for fixing the T-shaped extension 96 in the correct position in the undercut groove 102 of the profile bar 82.

For mounting the device 50 on the profile bar 82, one connecting element 85 is disposed in each of the recesses 84. Thus a total of two connecting elements 85 are required. A sliding block 104 is also disposed in an undercut groove 102 of the profile bar 82 and fixed in the required position with the threaded pin 108. Next, the hooklike extensions 100, protruding from the outer side 77 of the wall 78, of the connecting elements 85 disposed on the device 50 are guided into the undercut groove 102 of the profile bar 82. In this process the hooklike extensions 100 are initially pressed together by the side walls of the neck of the undercut groove 102. As soon as the hooklike extensions 100 have reached the region of the undercut of the undercut groove 102, they snap apart again because of their elastic embodiment. The device 50 along with the connecting elements 85 is slid in the groove 102 until one of the connecting elements 85 comes to rest on the sliding block 104.

Alternatively, the T-shaped extension 96 of the connecting element 85 can be embodied without a slot 98. For mounting on a profile bar 82, the connecting element 85 should in that case be introduced into the undercut 102 from a face end of a profile bar 82.

Figure 4:
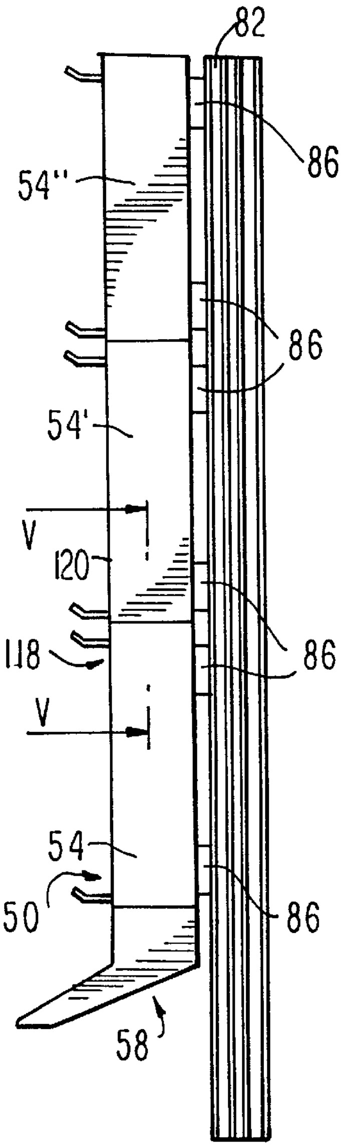
FIG. 4 is a side view of a plurality of chutes for material, stacked one above another, in a device in accordance with the second exemplary embodiment.

FIG. 4 shows how a plurality of chutes 54, 54', 54" of a device 50 are advantageously combined on a profile bar 82 with a plumb orientation to make a parts silo with a variable storage volume. The storage volume can easily be varied by way of the number of chutes 54, 54', 54". Each individual chute 54, 54', 54" is mounted on the profile bar 82 as described in FIG. 3. Because of the view here, only the legs 86 of the U are visible.

Figure 5:
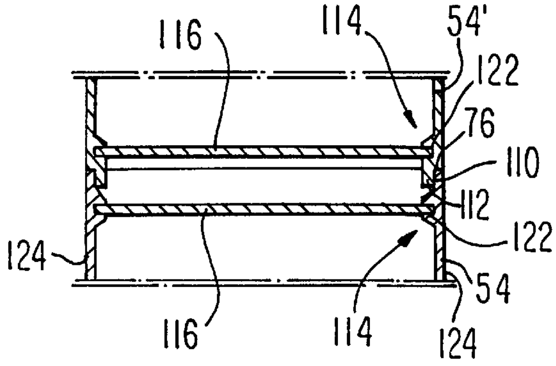
FIG. 5 is a sectional view taken along the lines V—V of FIG. 4.

As seen from FIG. 5, the second face end or opening 110 of the chute 54 then rests on the first opening 76 of the second chute 54'. An encompassing extension 112 is formed at the first opening 76 of the second chute 54' and protrudes into the first chute 54, where it has at least a slight press fit. The first chute 54 likewise communicates with the discharge point 56 via this kind of encompassing extension 112. In the present case, the second chute 54' is accordingly a connection part, which can be disposed at the second opening 110 of the first chute 54.

The chutes 54, 54', 54" have a closure 114 in the region of the opening 76, 110. Each closure 114 has a plate 116, which can be guided through a slot 118 in a wall 120 of the chute 54 opposite the wall 78 and can be guided in rails 122 embodied in the chute 54. The rails 122 are disposed in such a way that the opening 70, 110 can be closed by laterally introducing the plate 116. The rails 122 are embodied in the walls 124 that extend between the wall 120 and wall 78.

Figure 6:
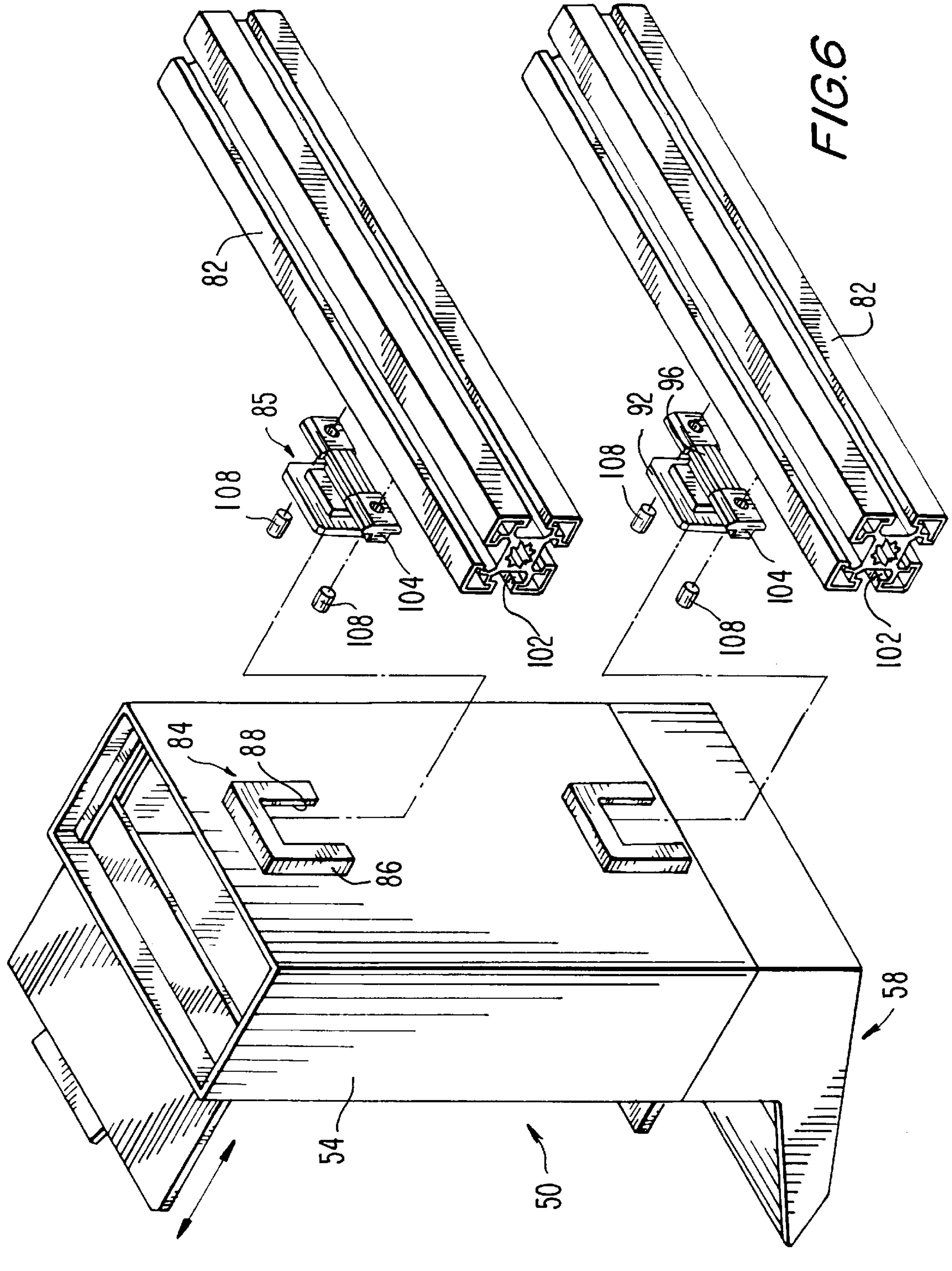
FIG. 6 shows a further securing option for a device according to the second exemplary embodiment.

FIG. 6 shows a further securing option for devices 50. Two horizontally disposed profile bars 82 are spaced apart such that two connecting elements 85 disposed in them can be disposed both in undercut longitudinal grooves 102 of the profile bars 82 and in the two recesses 84 of a device 50. In this way, an arbitrary number of devices 50 can be disposed side by side along the two profile bars 82.

An essential feature of this exemplary embodiment is also that the at least one chute 54 and the discharge point 56 are embodied as separate parts, or parts that can be connected separably to one another, and that the discharge point 56 can be disposed at one of the two openings 76, 110 of the at least one chute 54. As a result, it is possible to make a parts silo of variable storage volume from a plurality of chutes 54, 54', 54". If the chute 54 and the discharge point 56 were embodied as a single part, this would not be possible.

The two devices 10' shown in FIGS. 7–10 are similar to the first exemplary embodiment and can in part be considered to be more-detailed views. Identical elements are therefore identified by the same reference numeral; modified elements are identified by the same numeral, with a prime (').

Figure 7:
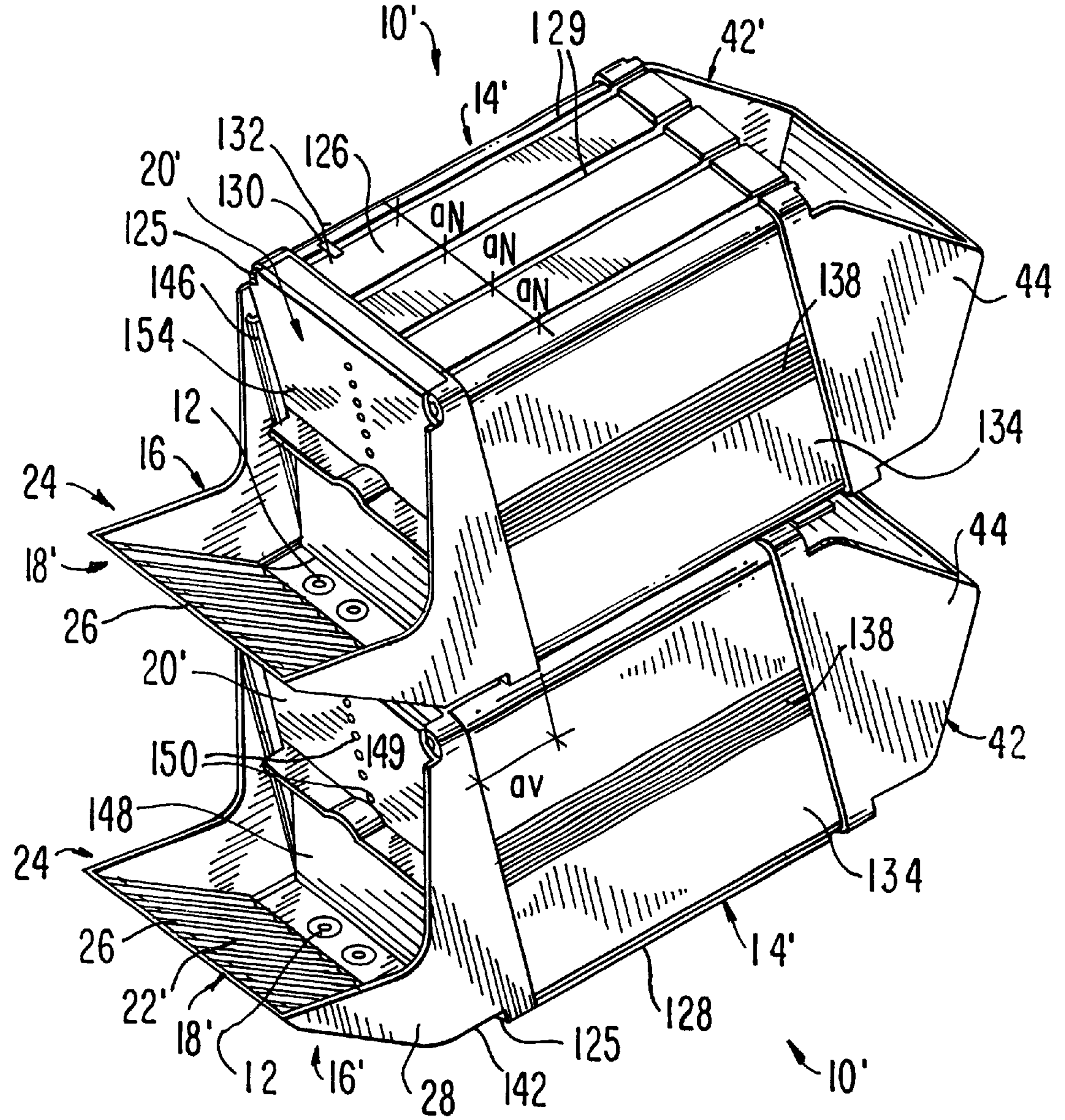
FIG. 7 is a first perspective view of two devices disposed one above the other.

In FIG. 7, two devices 10' are shown, which are stacked one above the other. However, more devices 10' can also be disposed one above the other. A base part on which the bottom device 10' is fastened is not shown. The devices 10' again serve to furnish material 12 to work stations. The material 12 can be components, such as the disks shown, or screws, nuts, electronic components, and so forth; in particular, they are small parts that are mounted at work stations where the work is done by hand.

Each of the devices 10' has a chute 14', a discharge point 16', and a connection part 42'. The discharge point 16' and the connection part 42' are secured to the chute 14' via screws 125—preferably with a self-tapping thread. However, other connection options between the chute 14 and the discharge point 16 are also possible. For instance, the connection can be an adhesive, welded, screw, rivet or other type of connection.

The reservoir for the material 12, embodied as the chute 14', substantially has a polygonal, preferably rectangular cross-sectional area, with the outer edges rounded. However, other cross-sectional areas are also possible. The chute 14' is a semifinished product, made for instance as an extruded aluminum profile or an extruded plastic profile. This makes very economical production possible. The chute 14' can also be cut to the requisite length, and thus the requisite volume for the material 12 can be achieved in a simple way. The wall thickness of the chute 14' is selected as a function of the material comprising the chute 14', its possible maximum length, and the material 12 that is to be stored in it.

For stable disposition of the devices 10' above one another, corresponding, preferably T-shaped extensions 128 and undercut grooves 29 are embodied along two opposed outer ends 126 and 127 of the chute 14'; the extensions and grooves preferably extend longitudinally of the chute 14'. In this case, when the device 10' or chute 14' is in its operational disposition, the outer end 126 is the top side, while the outer end 124 is the bottom side. For assembly, the extensions 128 of the first device 10' are thrust into the grooves 129 of the second device 10'.

Four undercut grooves 129 are provided along the outer end 126. The center longitudinal planes of the grooves 129 are disposed at equal spacings $a_N$ to one another. Extending along the outer end 127 are two extensions 128, which have a T-shaped cross-sectional area and have a clearance or sliding fit in the grooves 129. The spacing $a_F$ of the center longitudinal planes of the extensions 128 is $3*a_N$. The reason for this is that with devices 10 of different widths, a modular construction with devices 10' of different sizes can be made. Two devices 10', not shown, each having half the width, can be disposed on the device 10' shown that has the four grooves 129; these devices not shown each have two extensions 128 with a spacing $a_T$ on their outer ends 127, this spacing being equal to the spacing $a_N$. Correspondingly, two grooves 129 with a spacing of the center longitudinal planes of $a_N$ are provided on the outer ends 126 of these devices that are not shown. In turn, on these two devices 10', a device 10' of the type that is shown can then for example be mounted, and so forth. In this way, various devices 10' adapted to one another can be put together in modular fashion for a work station and can form a stable composite element.

Figure 8:
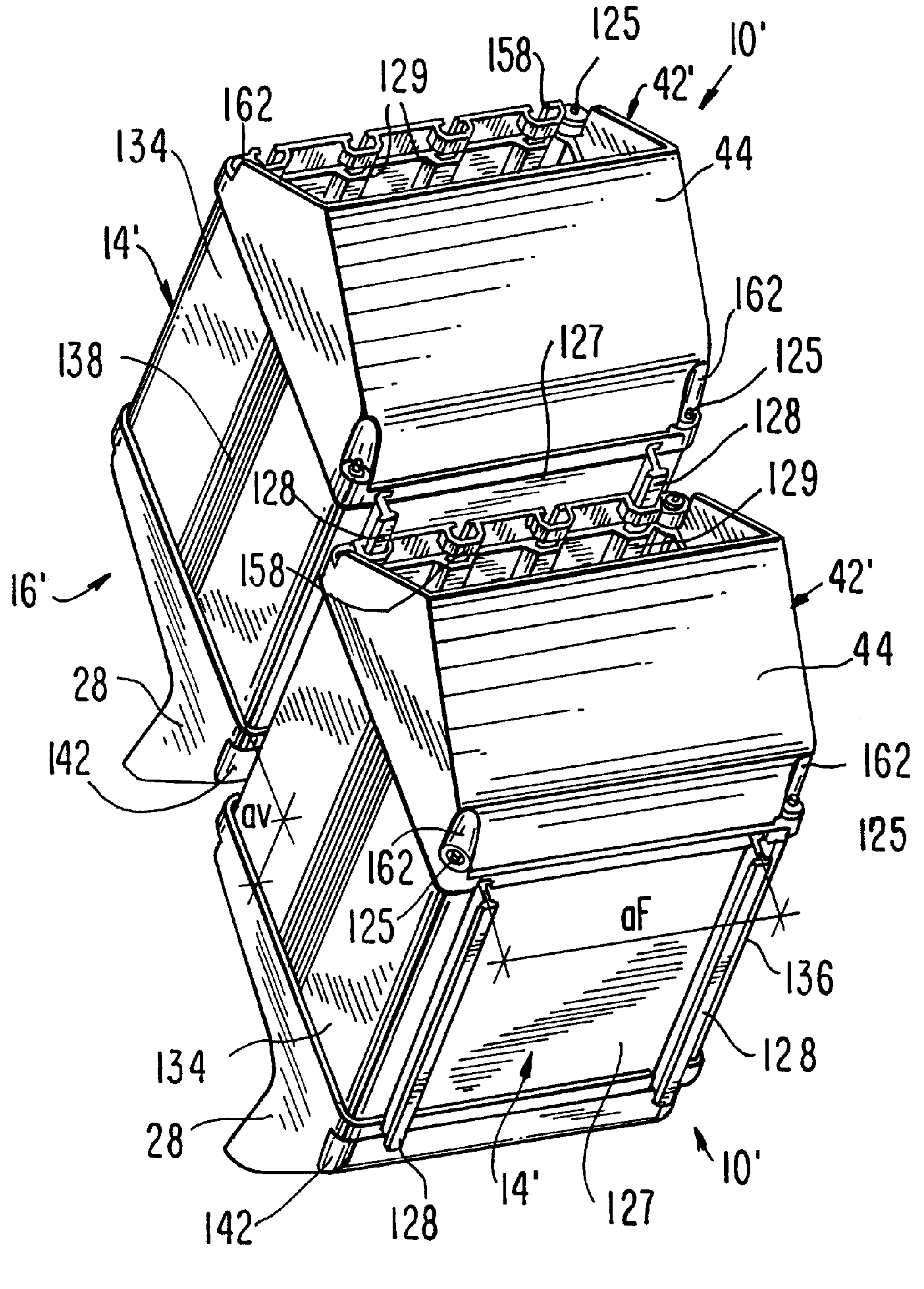
FIG. 8 is a second perspective view of the two devices of FIG. 7 disposed one above the other.

As symbolically shown in FIG. 8, to fix the position of devices 10' disposed one above the other, at least one sliding block 130 is disposed in the grooves 129; it is fixed with a screw 132, such as a threaded pin. By means of the extensions 128, the undercut grooves 129, the sliding blocks 130 and the screws 132, devices 10' disposed one above the other can be positioned with an infinitely variable offset $a_V$ from one another. This makes it possible to optimize a work station in terms of ergonomics.

Grooves 138 extending parallel to one another are embodied along the outer sides 134, 136 extending between the outer ends 126, 127. This improves the grip of the device 10'.

Figure 9:
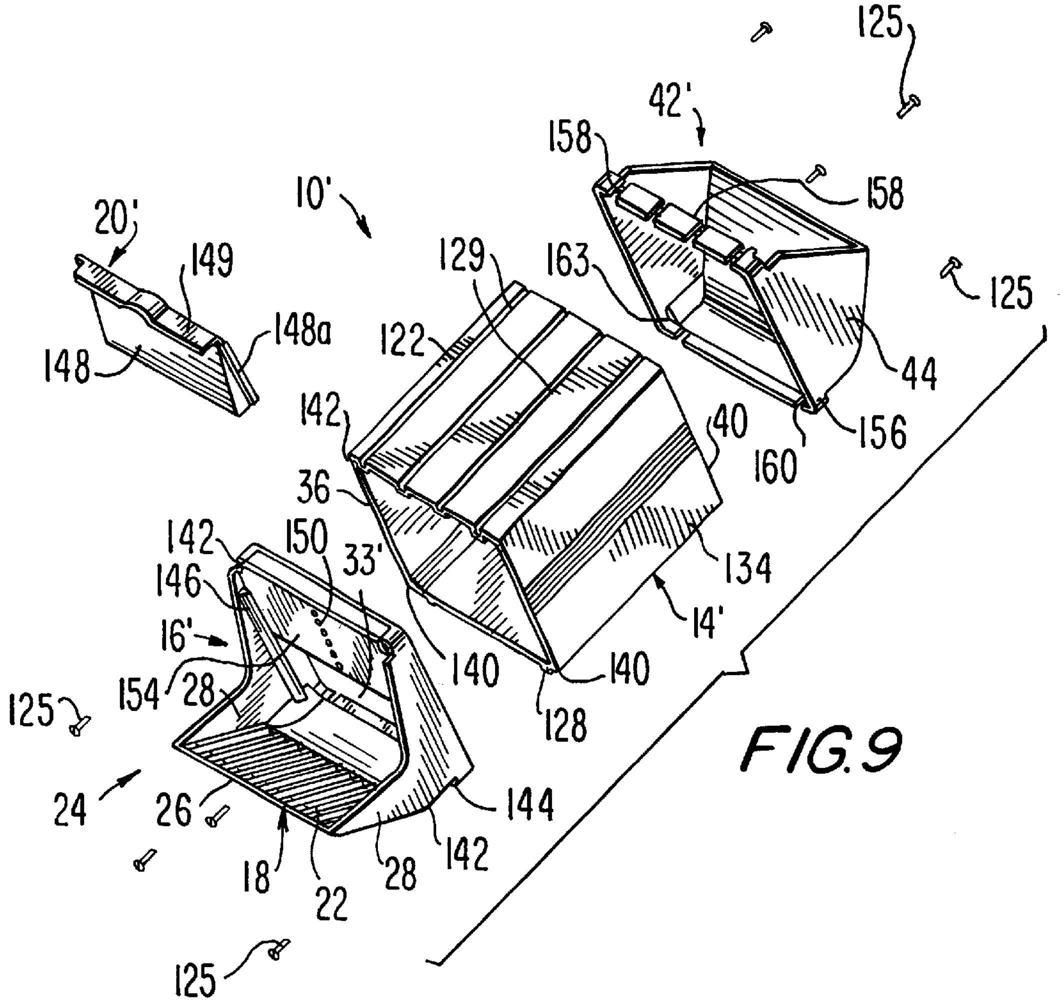
FIG. 9 is a perspective exploded view of one of the devices of FIG. 7.

As seen from FIG. 9, screw channels 140 for the screws 125 are formed in the four corner regions of the chute 14'. The screw channels 140 are open toward the outside by means of a slot 142, which is favorable for the production of the chute 14'.

Figure 10:
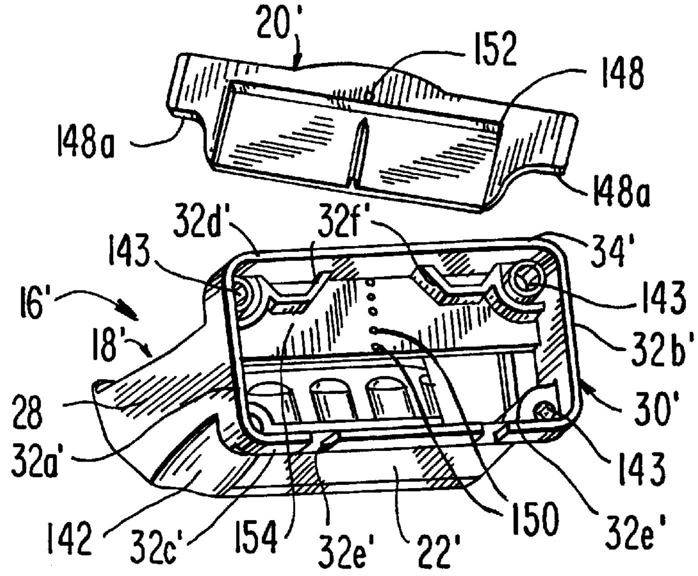
FIG. 10 is a perspective exploded view of a material metering arrangement of FIG. 8.

The discharge point 16', which is clearly shown in the view of FIGS. 9 and 10, as a further component of the device 10, adjoins the chute 14' and comprises a gripper tongue 18', a framelike portion 30' and a material metering arrangement 20', as is shown particularly clearly in FIGS. 9 and 10. The gripper tongue 18 and the material metering arrangement 20 are made for example of metal as diecast parts and/or of plastic as injection molded parts.

The gripper tongue 18' has a base plate 22', with depressions for gripping purposes, known per se, on which the material 12 comes to a stop. An obliquely upward-protruding wall 26 is provided on the access side 24, that is, the side from which the material 12 is removed for assembly purposes. The gripper tongue 18' also has two side walls 28.

The portion 30' of the discharge point 16' has a substantially polygonal, preferably rectangular cross-sectional area, with rounded corner regions. Two opposed walls **32*a*', 32*b*' merge with the side walls 28 of the base plate 22'. A further wall 32*c*' of the portion 30', remote from the access side 24, merges via a rounded corner with the base plate 22'. A wall 32*c*', which is opposite the wall 32*d*', closes the portion 30' to form a frame. Through an opening 33' of the portion 30', material from the portion 30' can slide onto the base plate 22' of the gripper tongue 18'. Because of the oblique position of the device 10' relative to the vertical, the material 12 slides by gravity through the chute 14' onto the gripper tongue 18' and is stopped by the obliquely upward-protruding wall 26**.

The portion 30' is preferably disposed at a certain angle from the base plate 22' of the gripper tongue 18'. The framelike or chutelike portion 30' ends at a face end 34', which can disposed at a face end 36 of the chute 14'. The chute 14' and discharge point 16' can preferably be put together in plug-type fashion, and the portion 30' is dimensioned such that the chute 14' can be inserted into the portion 30' of the discharge point 16'.

Recesses 142 with adjoining bores 143 through the corner regions of the portion 30' with bearing faces 144 for the screws 125 are provided in the corner regions of the discharge point 16'.

At the discharge point 16', two rails 146 are provided, which are embodied on the two side walls 28 of the gripper tongue 18' and preferably extend over virtually their entire height. The rails 146 have an L-shaped cross-sectional area. A portion 148, which in the present exemplary embodiment is flat, of the material metering arrangement 20' is guided on the rails 146. To that end, two ribs **148*a* protrude from the portion 148 and engage the rails 146. The material metering arrangement 20' is also guided between the rails 146 and the portion 30'. Precisely because of the great length of the rails 146, good guidance of the material metering arrangement 20' is provided. For the sake of better handling, a handle 149 or handle-like strip is also provided on the material metering arrangement 20'**.

For graduatedly changing the size of the opening 33' of the discharge point 16', bores 150 are provided on the discharge point 16'. To that end, the portion 30' of the discharge point 16' is preferably partly closed by a wall 154 in the region opposite the gripper tongue 18'. The bores 150 are disposed in a line in the wall 154. The material metering arrangement 20' also has at least one bump 152 that corresponds with the bores 150. By suitably adjusting the material metering arrangement 20', the bump 152 can be brought selectively into engagement with the bores 150. As a result, the size of the opening 33' can be adjusted firmly and securely.

The wall **32*c*' of the portion 30' also has slots 32*e*' for the extensions 128 of the chute 14'. However, only two slots 32*e*' each are shown. The wall 32*d*' has recesses 32*f*' for the grooves of the chute 14'**.

The connection part 42' is disposed on the second face end 40 of the chute 14'. It can be seen particularly from FIG. 9 that the connection part 42' has a fill hopper 44. The fill hopper 44 is designed such that material 12 can be introduced into it and reach the chute 14'. The connection part 42' has a frame 156, similar to the portion 30', that surrounds the face end 40 of the chute 14'. At the points where the extensions 128 and the undercut grooves 129 open into the region of the face end 40, the frame 156 has groovelike cutouts 158 or notches 160. Four cutouts 158 are aligned with the four grooves 129, and two notches 160 are aligned with the extensions 128. In this way, even a greater number of fully assembled devices 10' can be put together. For securing the connection part 42', once again recesses 162 and bores 163 for the screws 125, which are similar to the recesses 142 and bores 143, respectively, are provided.

It is also essential in the device 10' that the at least chute 14' and the discharge point 16' are embodied as separate parts, or as parts separably connected to one another, and that the discharge point 16' can be disposed on one of the face ends 36, 40 of the at least one chute 14'. As a result, the chute 14' can be produced as a semifinished product with a variable length. This would not be possible if the chute 14' and the discharge point 16' were made in one piece.

What is claimed is:

1. A device (10, 10', 50) for furnishing material (12) to work stations, which has at least one reservoir, embodied as a chute (14, 14', 54), for the material (12), the chute being adjoined by a discharge point (16, 16', 56) that has a gripper tongue (18, 18', 58) and preferably has a material metering arrangement (20, 20'), characterized in that the at least one chute (14, 14', 54) and the discharge point (16, 16', 56) are embodied as parts separably connected to one another, and that the discharge point (16, 16', 56) can be disposed on one of the two face ends (36, 40, 76, 110) of the at least one chute (14, 14', 54).

2. The device (10, 10', 50) of claim 1, characterized in that a gripper tongue (18, 18', 58) of the discharge point (16, 16', 56) is adjoined by a portion (30, 30', 70) whose opening (33,

33', 74) can be disposed on the face (36, 40, 76, 110) of the at least one chute (14, 14', 54).

3. The device (10, 10', 50) of claim 1, characterized in that the at least one chute (14, 14', 54) and the portion (30, 30', 70) of the discharge point (16, 16', 56) have a substantially polygonal, preferably rectangular, cross-sectional area.

4. The device (10, 10', 50) of one of with claim 1, characterized in that the at least one chute (14, 14', 54) and the discharge point (16, 16', 56) can be put together in plug-type fashion.

5. The device (10, 50) of claim 4, characterized in that an extension (38) extending all the way around the opening (33, 74) of the portion (30, 70) adjoins this portion and can be inserted into the at least one chute (14, 54), and that the surrounding extension (38) and the at least chute (14, 54) preferably have a press fit.

6. The device (10, 10', 50) of claim 1, characterized in that a connection part (42, 42', 54, 54"), which is preferably adjoined by a fill hopper (44) and/or a cover, can be disposed on a second face end (40, 110) of the at least one chute (14, 14', 54).

7. The device (10, 10') of claim 1, characterized in that a plurality of devices (10, 10') can be disposed one above the other.

8. The device (10, 10', 50) of claim 1, characterized in that the chute is an extruded profile.

9. The device (10') of claim 1, characterized in that for disposing devices (10') one above the other, extensions (128) and undercut grooves (129) corresponding with one another are embodied on two opposed outer ends (126, 127) of the chute (14').

10. The device (10') of claim 1, characterized in that T-shaped extensions (128) are provided on one of the outer ends (127), and undercut grooves (129) are provided on the opposite outer end (126), and that the extensions (128) and undercut grooves (129) extend longitudinally of the chute (14').

11. The device (10') of claim 9, characterized in that for fixing the position of devices (10') disposed one above the other, at least one sliding block (130), which can be fixed with a screw (132), can be disposed in the grooves (129).

12. The device (10') of claim 1, characterized in that screw channels (140) are provided in corner regions of the chute (14'), and that the discharge point (16') and preferably a connection part (42') can be secured to the chute (16') via screws (125).

13. The device (10') of claim 1, characterized in that the discharge point (16') has a gripper tongue (18') and a portion (30') in the form of a frame, in corner regions of which recesses (142) for the screws (125) are provided.

14. The device (10') of claim 1, characterized in that the chute (14') is insertable into the portion (30') of the discharge point (16').

15. The device (10') of claim 1, characterized in that rails (146) are provided at the discharge point (16'), which extend preferably over virtually the entire height of two side walls (28) the gripper tongue (18'), and a portion (148) of the material metering arrangement (20') can be guided into them.

16. The device (10') of claim 1, characterized in that for changing the size of the opening (33') of the discharge point (16') in a graduated way, bores (150) are provided at the discharge point (16'), and that the material metering arrangement (20') has at least one bump (152) that can be brought selectively into engagement with the bores (150).

17. The device (10') of claims 1, characterized in that the portion (30') of the discharge point (16') is partly closed by a wall (154) in the region remote from the gripper tongue (18'), and that the bores (150) are disposed in a line along the wall (154).

18. The device (50) of claim 6, characterized in that the connection part is at least one chute (54, 54', 54"), which in the region of the openings (76, 110) preferably has a closure (114), which has a plate that can be guided through a slot (118) in a wall (120) of the chute (54, 54', 54") and in rails (122) embodied in the chute (54, 54', 54").

19. The device (50) of claim 1, characterized in that means (80) for securing the device (50) to at least one other part (82) are provided on the wall (78) of the chute (54, 54' 54"), and a U-shaped receptacle (84) is provided on the wall (78), in which receptacle a disk (92) of a connecting element (85) can be disposed, on which at least one extension (96, 100) is provided that can be disposed in an undercut groove (102) of a profile bar (82), and that preferably sliding blocks (104) are provided with a transverse bore (106) for a threaded pin (108) for fixation of the T-shaped extension (96).

* * * * *